Dec. 2, 1969            N. PORATH            3,482,156
PERMANENT MAGNET ROTOR TYPE MOTOR AND CONTROL THEREFOR
Filed July 19, 1966            11 Sheets-Sheet 1
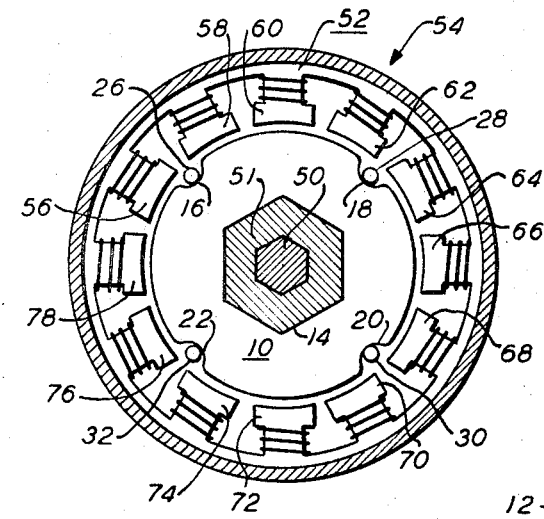
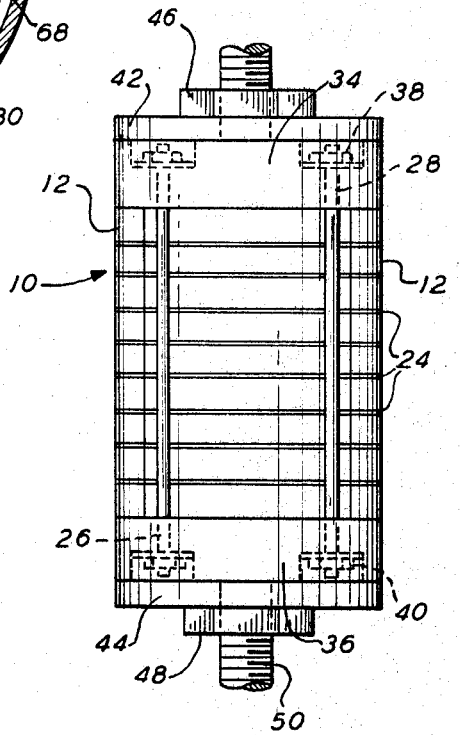
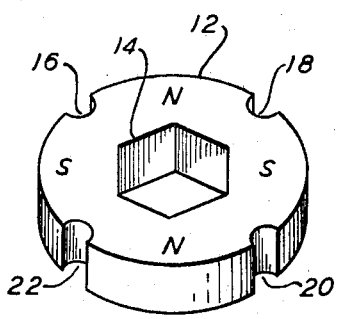
*INVENTOR*
*NACHUM PORATH*
BY            *ATTORNEY*

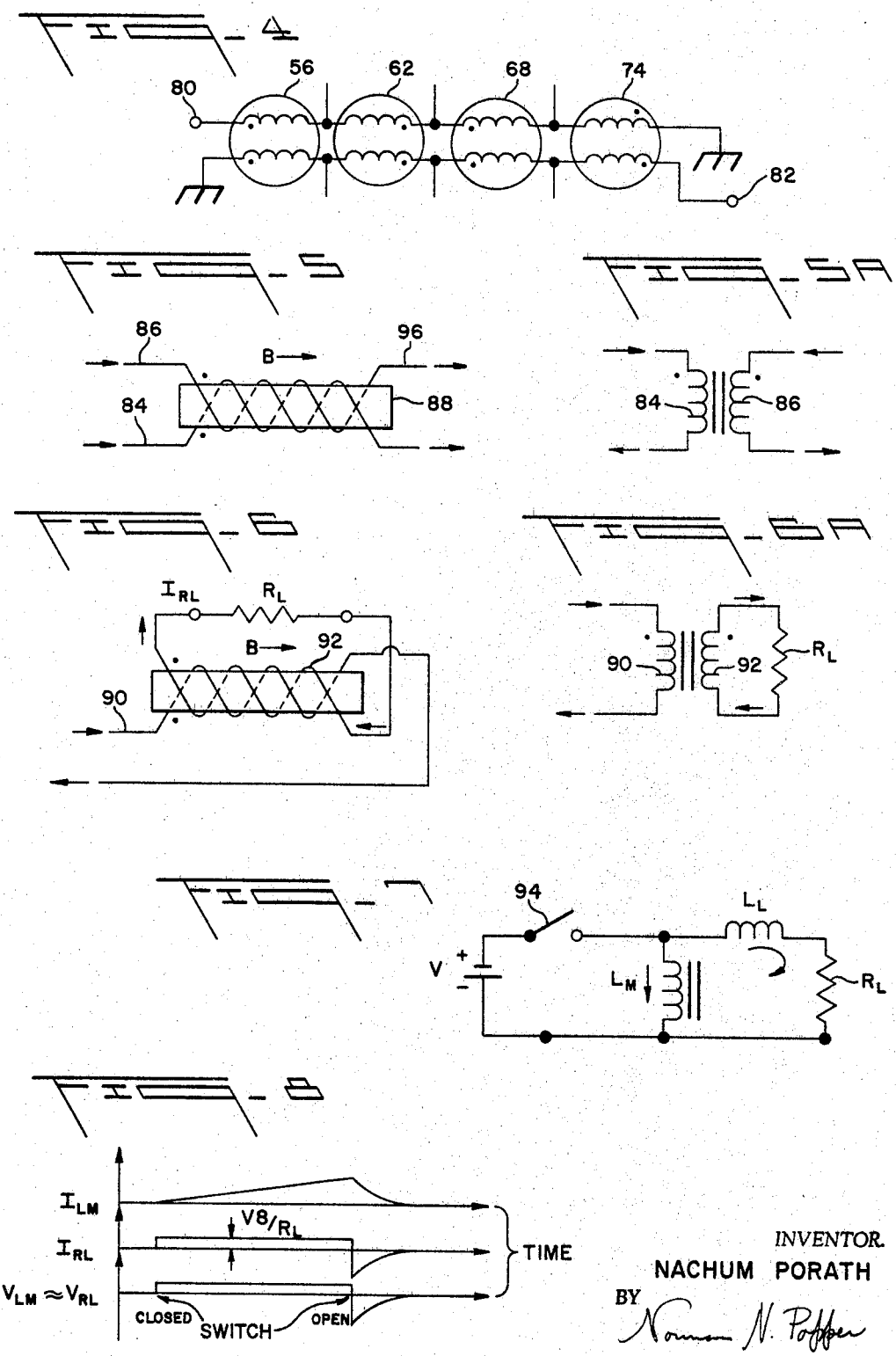

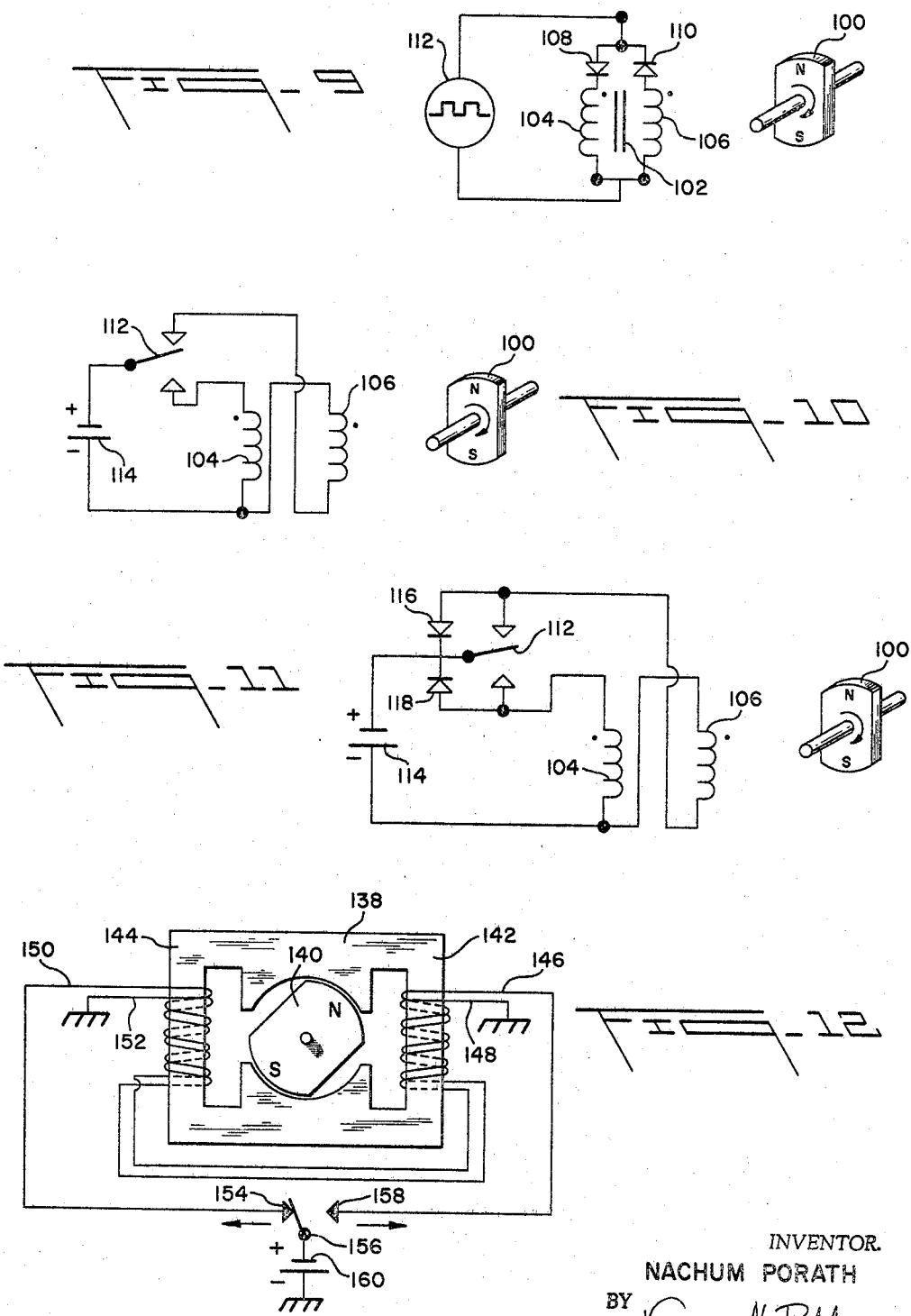

INVENTOR.
NACHUM PORATH

Dec. 2, 1969    N. PORATH    3,482,156
PERMANENT MAGNET ROTOR TYPE MOTOR AND CONTROL THEREFOR
Filed July 19, 1966    11 Sheets-Sheet 5

INVENTOR.
NACHUM PORATH
BY Norman N. Popper
ATTORNEY

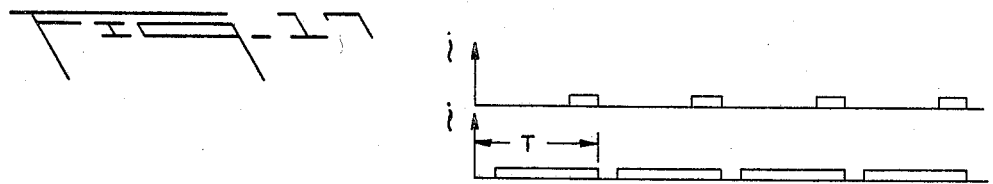
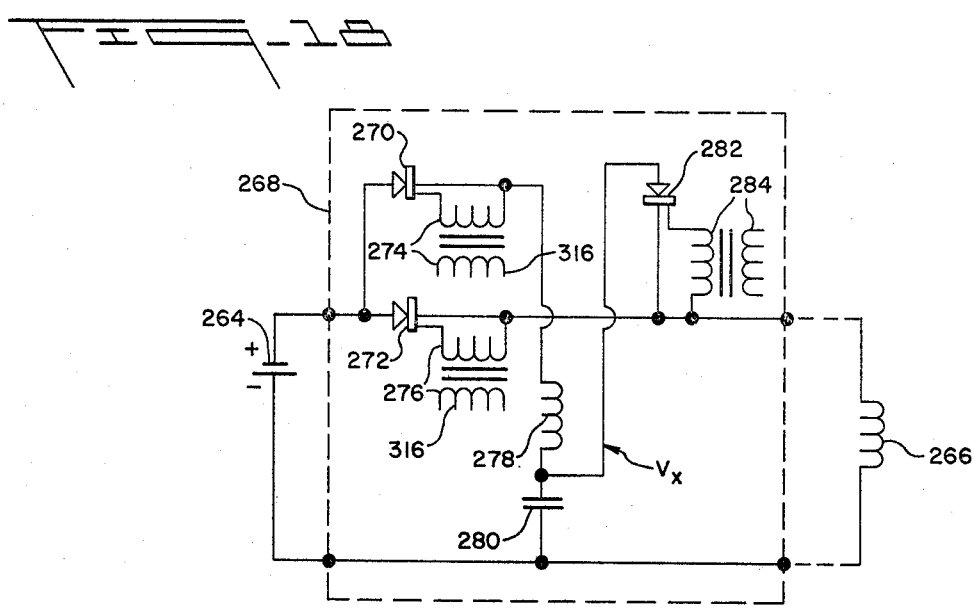
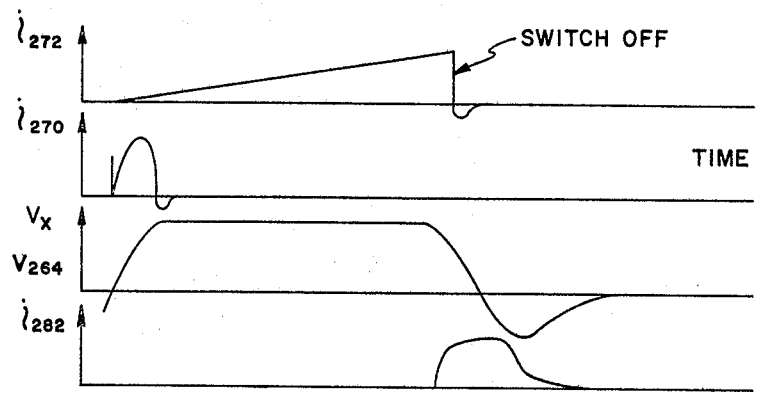
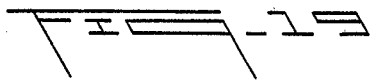

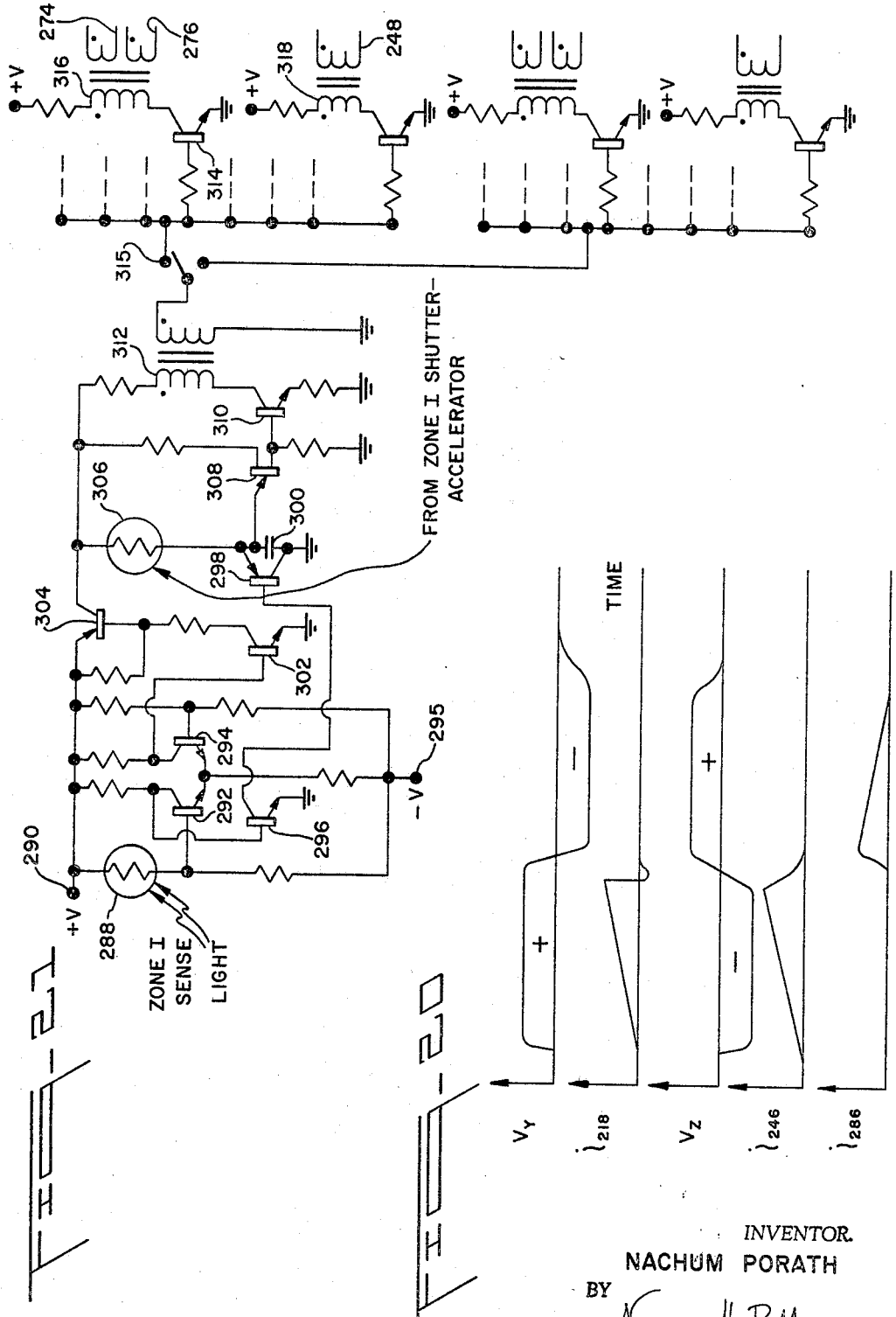

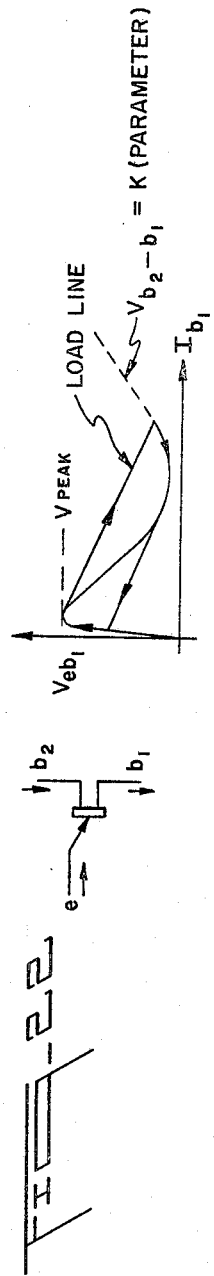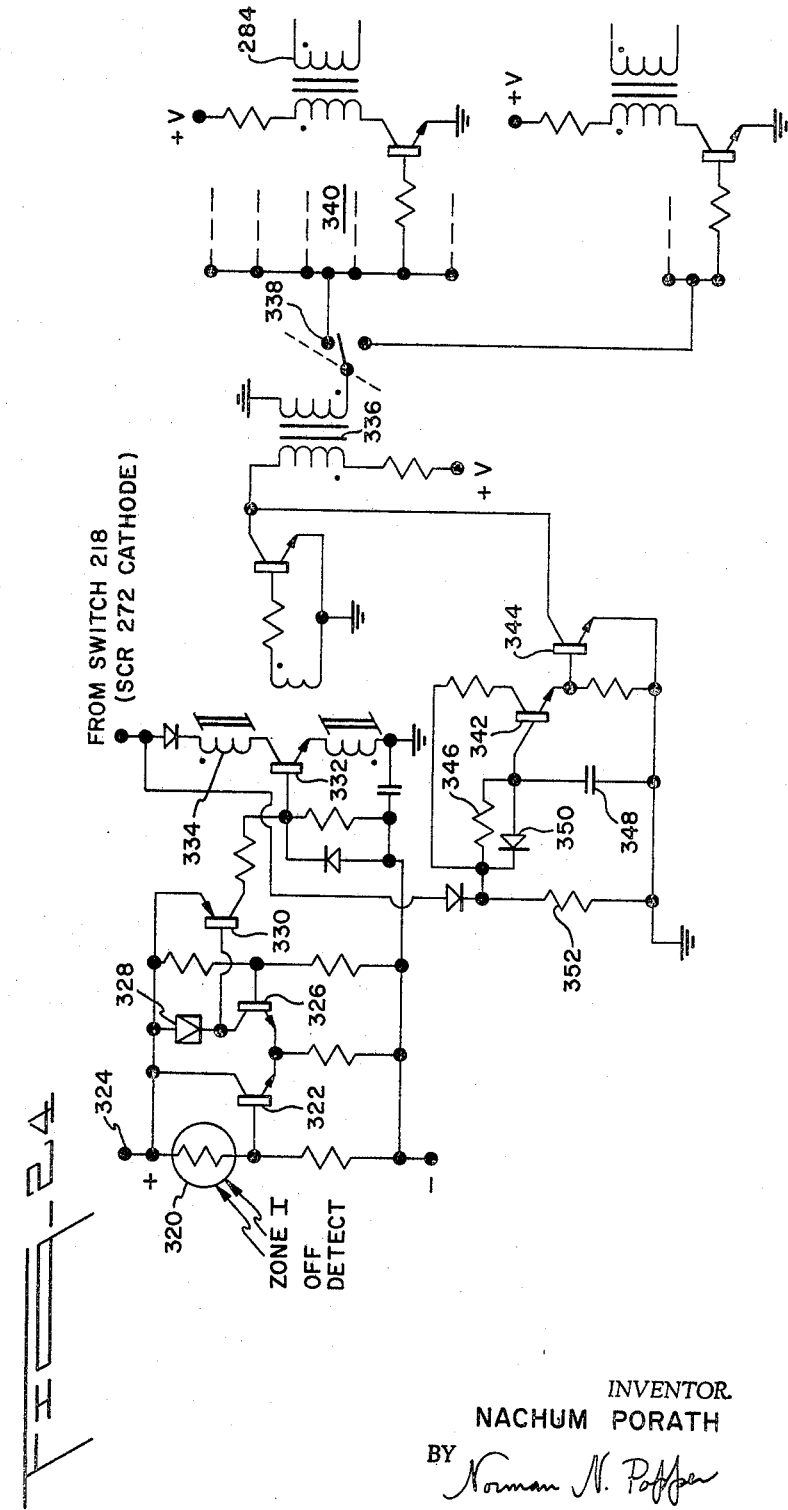

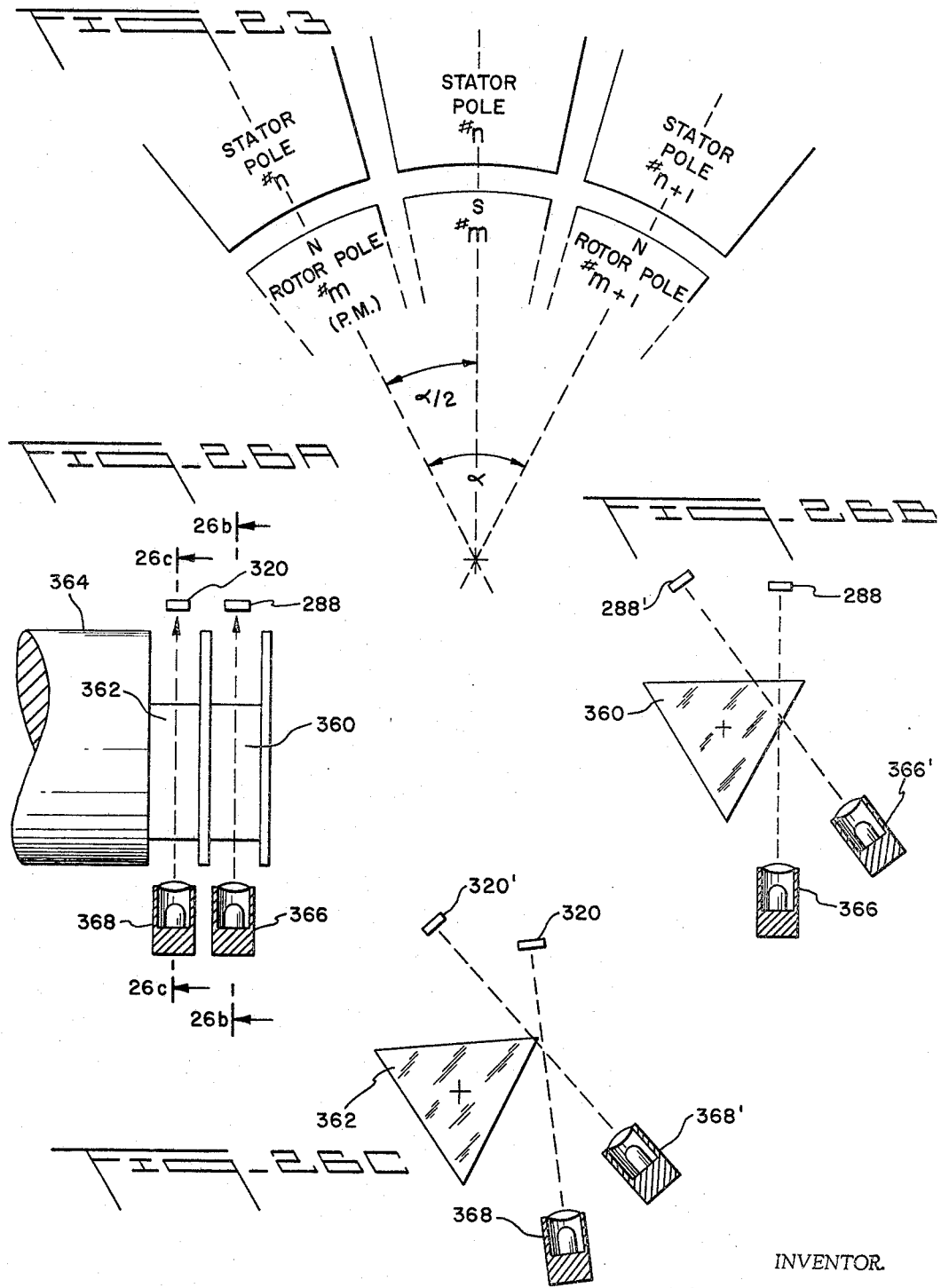

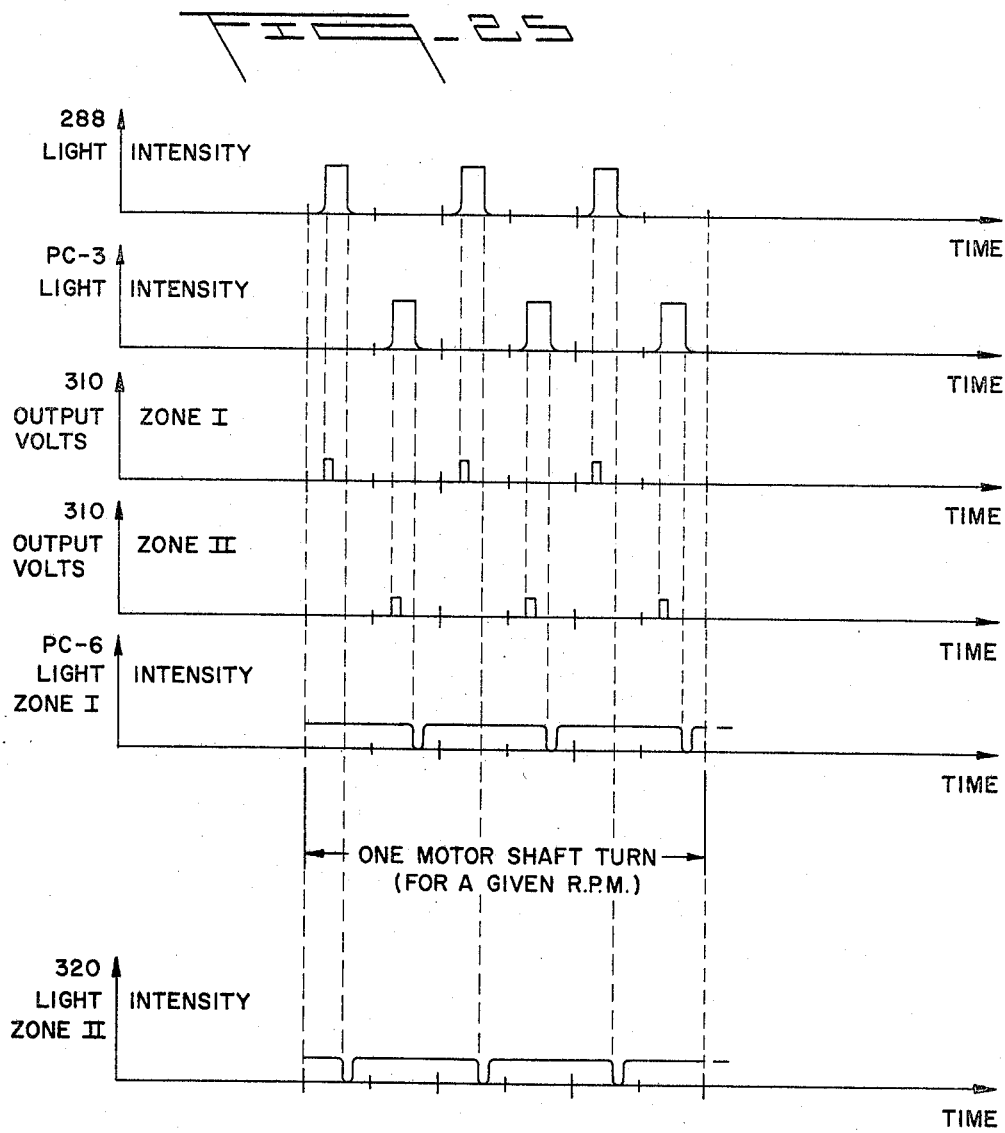

Dec. 2, 1969 N. PORATH 3,482,156
PERMANENT MAGNET ROTOR TYPE MOTOR AND CONTROL THEREFOR
Filed July 19, 1966 11 Sheets-Sheet 11
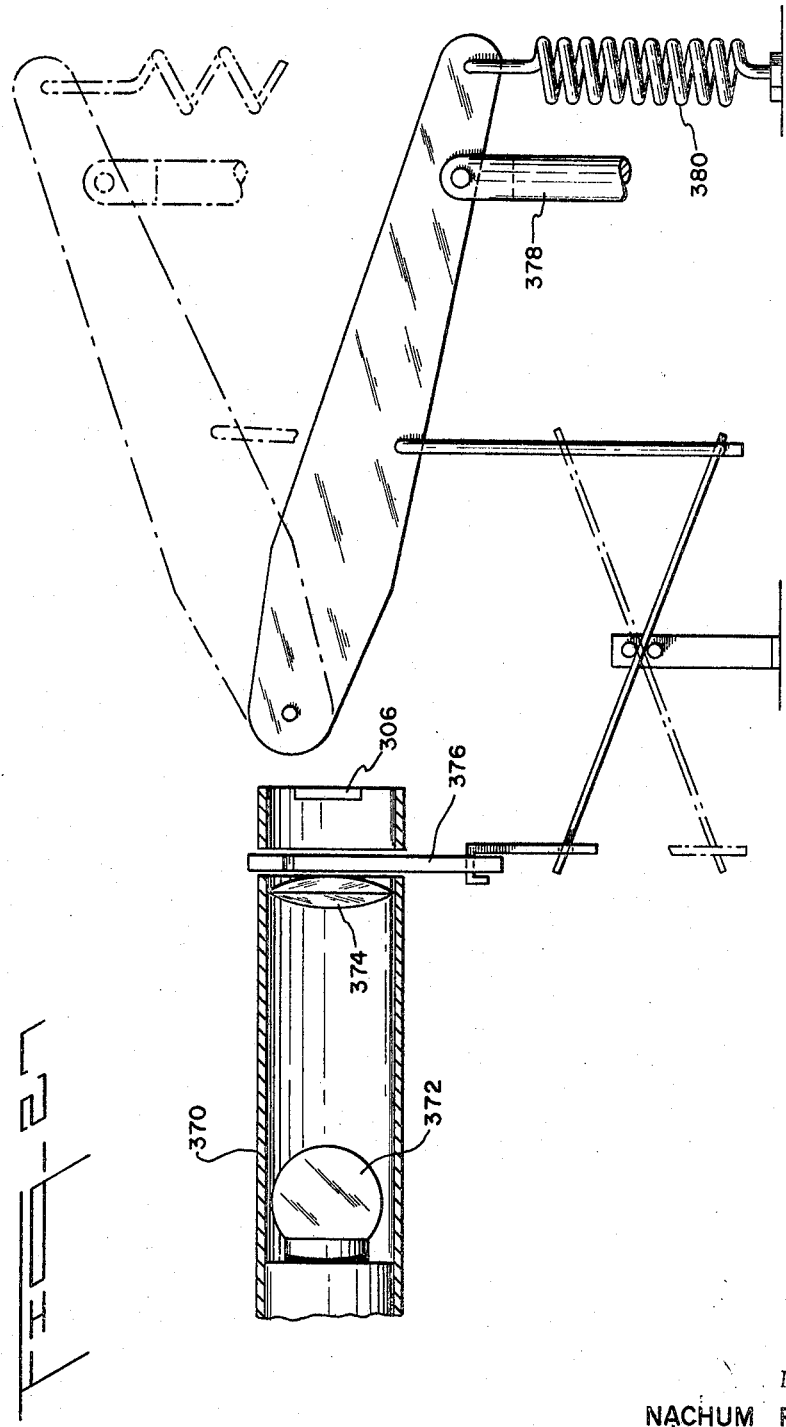
INVENTOR.
NACHUM PORATH
BY Norman N. Poffer
ATTORNEY

United States Patent Office 3,482,156
Patented Dec. 2, 1969

3,482,156
PERMANENT MAGNET ROTOR TYPE MOTOR AND CONTROL THEREFOR
Nachum Porath, 10 Partners Road,
Wappinger Falls, N.Y. 12590
Filed July 19, 1966, Ser. No. 566,370
Int. Cl. H02p 5/00, 7/00; H02k 29/00
U.S. Cl. 318—138                                11 Claims

ABSTRACT OF THE DISCLOSURE

An integral horsepower brushless motor and control therefor having a rotor comprising cylindrical segments of ceramic magnets stacked axially with a resilient resin therebetween, and a stator comprised of a plurality of pole pairs each wound with a bifilar winding such that one winding of each pole pair can be selectively placed in series or in parallel with one winding of every other pole pair, and the other winding of each pole pair can be placed in series or parallel with the other winding of every other pole pair. When the windings are in series, the motor will be high torque, low speed; when in parallel the motor will be low torque high speed. The use of bifilar windings also makes possible the application of time pulses to the windings to vary the power supplied to the motor.

---

In general, this invention relates to a new and improved permanent magnet rotor and control therefore. More particularly, it relates to an integral horsepower brushless motor with control circuitry for wide speed and torque range operation.

Integral horsepower motors with controllable torque over wide ranges of speed are widely used today in industry as the source for mechanical power in chemical, transportion, and many other industries. Where a wide range of speed was required, direct current motors with brushes were used. These motors had many major disadvantages most of which flowed from their use of brushes. The brushes require continuous supervision and maintenance and this created as the brushes were worn, clogging of the motor bearings, and shortened the life span of the motor. Further, sparks generated by the brushes touching different segments of the commutator copper pieces prevented using such a motor in a volatile environment.

Today, when energy sources like a fuel cell and new switching devices are available, a new motor construction with its associated control circuitry is possible for portable or stationary applications that does not have the disadvantages mentioned above and has the electrical and mechanical charactistics of direct current shunt wound motors.

Therefore, it is the general object of this invention to avoid and overcome the foregoing and other difficulties of the prior art practices by the provision of a new and better permanent magnet rotor motor and controls therefore.

Another object of this invention is the provision of a new and better integral horsepower motor which is more efficient and economical in use and does not require brushes or the like.

Still another object of this invention is a new and better permanent magnet motor which uses the magnetizing inductance throughout the rotation of the rotor so as to achieve more efficient utilization of the electric power supplied to the motor.

A further object of this invention is the provision of a new and better motor which can be controlled, efficiently for variations in torque, speed, and power.

A still further object of this invention is the provision of a static control system for a brushless motor capable of controlling large amounts of power at extremely high speeds.

A further object of this invention is the provision of control circuitry for a brushless motor having a permanent magnet rotor which will be protected if malfunction occurs in the sensing devices utilized to operate the motor.

Another object of this invention is the production of a new and better permanent magnet rotor motor in which the rotor can be manufactured from existing materials and can be capable of high speed-high torque operation.

Still another object of this invention is the provision of a new and better rotor for a permanent magnet brushless motor which can be simply and easily manufactured.

Another object of this invention is the provision of brushless motor capable of control for both high torque, low speed and low torque, high speed operation which is further controllable to achieve variations in acceleration.

Other objects will appear hereinafter.

The objects of the present invention are achieved by the provision of a new and better integral horsepower brushless motor having a rotor comprising cylindrical segments of ceramic magnets magnetized, along its edges, into one or more pole pairs and stacked axially with a resilient epoxy therebetween so that the normally brittle ceramic magnet segments can withstand high torque-high speed operations. The rotor, which initially has a rough outer surface, is ground to size.

The stator comprises a plurality of pole pairs each wound with a bifilar winding and arranged so that one winding of each pole pair can be placed in series with one winding of every other pole pair or in parallel therewith. The other winding of each pole pair is in series or parallel with the other winding of every other pole pair. When the bifilar windings are in series the motor will operate under high torque, low speed conditions and when the windings are placed in parallel, the motor will operate under low torque high speed operation. Thus, by shifting between series and parallel operation, it is possible to "gearshift" the motor. By utilizing bifilar windings, it is possible to utilize the magnetic inductance necessary to drive the motor for movement through an arc of one-half the angle defined by a single pole pair and, during the next half an angle the magnetic energy recovery is performed by the other bifilar winding and returned to the source of power. By timing the duration of the application of pulses to the bifilar windings it is possible to vary the power supplied to the motor.

Further, this time duration which controls the power can be manually controlled so as to achieve acceleration control over the motor.

The associated circuitry necessary to achieve the above results is further designed to prevent injury to the motor or those operating the motor should any of the elements controlling the motor fail. Thus, the failure of any of the elements merely causes the motor to operate at its low power condition or, in the alternative, to be turned off.

For the purpose of illustrating the invention, there are shown in the drawings forms which are presently preferred; it being understood, however, that this invention is not limited to the precise arrangements and instrumentalities shown.

FIGURE 1 is a front view of a rotor utilized in the motor of the present invention.

FIGURE 2 is a perspective view of one of the sections making up the rotor of FIGURE 1.

FIGURE 3 is an end view of the motor of the present invention.

FIGURE 4 is a schematic showing of the connection of bifilar windings on the stator of a motor built in accordance with the principles of the present invention.

FIGURE 5 shows a double winding inductor with current being forced through each of the individual bifilar windings.

FIGURE 5a is schematic showing of the construction of FIGURE 5.

FIGURE 6 shows a bifilar wound transformer.

FIGURE 6a is a diagrammatic showing of the arrangement of FIGURE 6.

FIGURE 7 is a schematic showing of the equivalent circuit for a transformer or motor.

FIGURE 8 includes current and voltage time diagrams for a motor or transformer immediately after closing of the switch as shown in FIGURE 7.

FIGURE 9 shows a simple permanent magnet rotor motor with bifilar wound field coils in schematic form.

FIGURE 10 shows a motor similar to FIGURE 9 with mechanical means to implement flux reversal.

FIGURE 11 shows a motor similar to FIGURE 10 with means to implement recovery of stored energy in the magnetizing inductance of the motor.

FIGURE 12 shows a single pole pair permanent magnet motor with a bifilar wound stator.

Figure 13A:
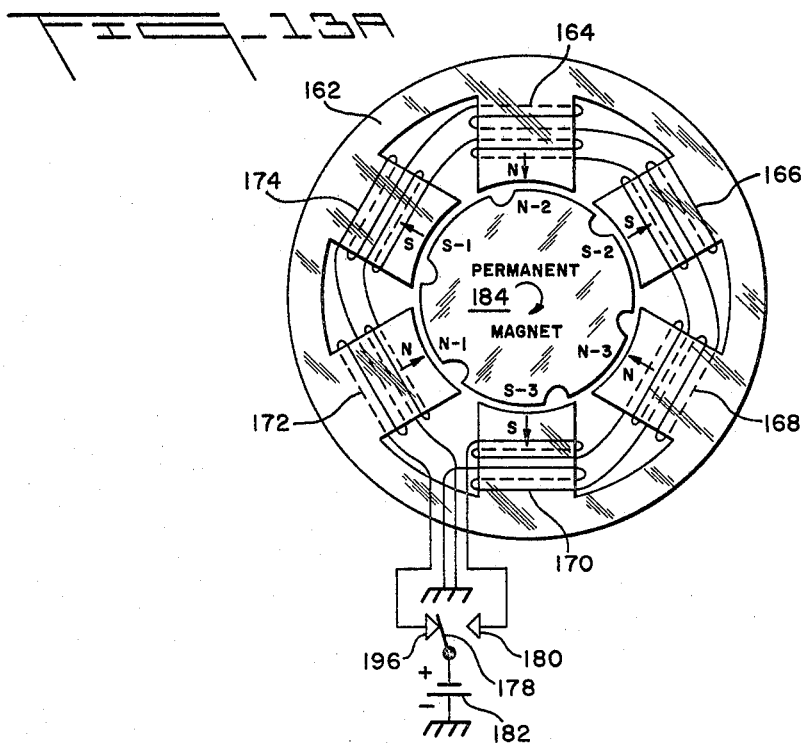

FIGURE 13a shows a multi pole pair motor with a bifilar wound stator, connected with its stator windings polarized in a first pattern.

Figure 13B:
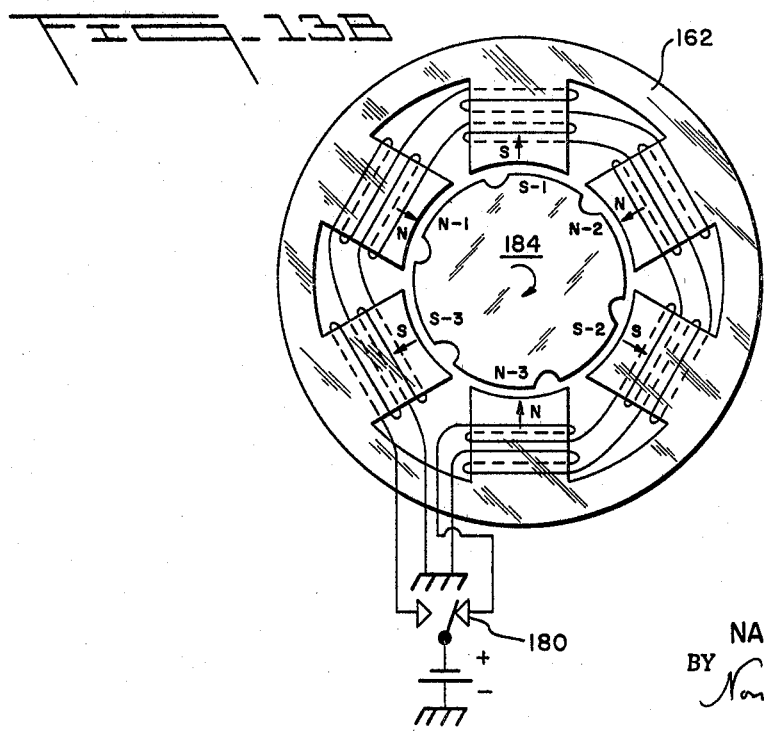

FIGURE 13b shows the multi pole pair motor of FIGURE 13a in the second polarization pattern.

Figure 14:
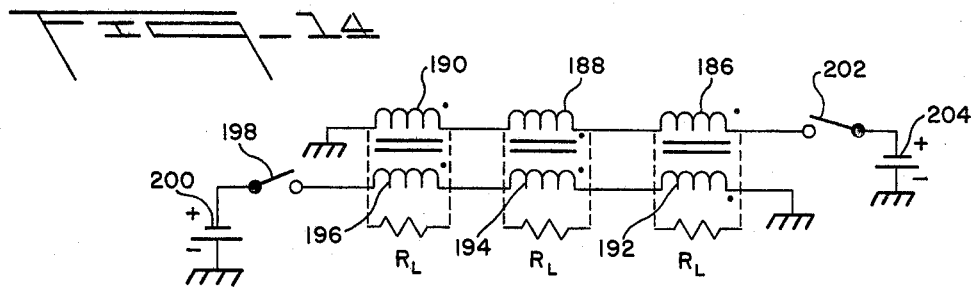

FIGURE 14 is a schematic showing of the three pole pairs motor of FIGURES 13 with the drive windings connected in series.

Figure 15:
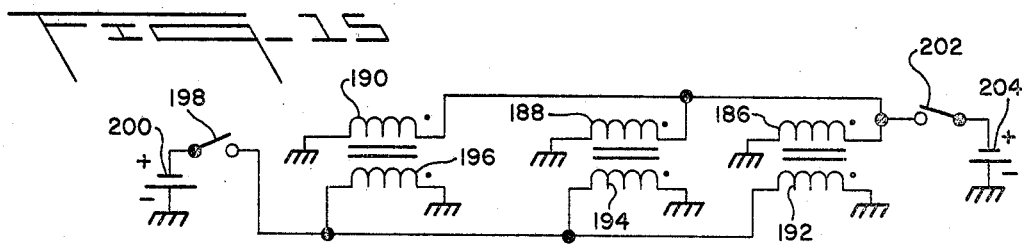

FIGURE 15 is a schematic of the three pole pairs motor of FIGURE 13 with the drive windings connected in parallel.

Figure 16:
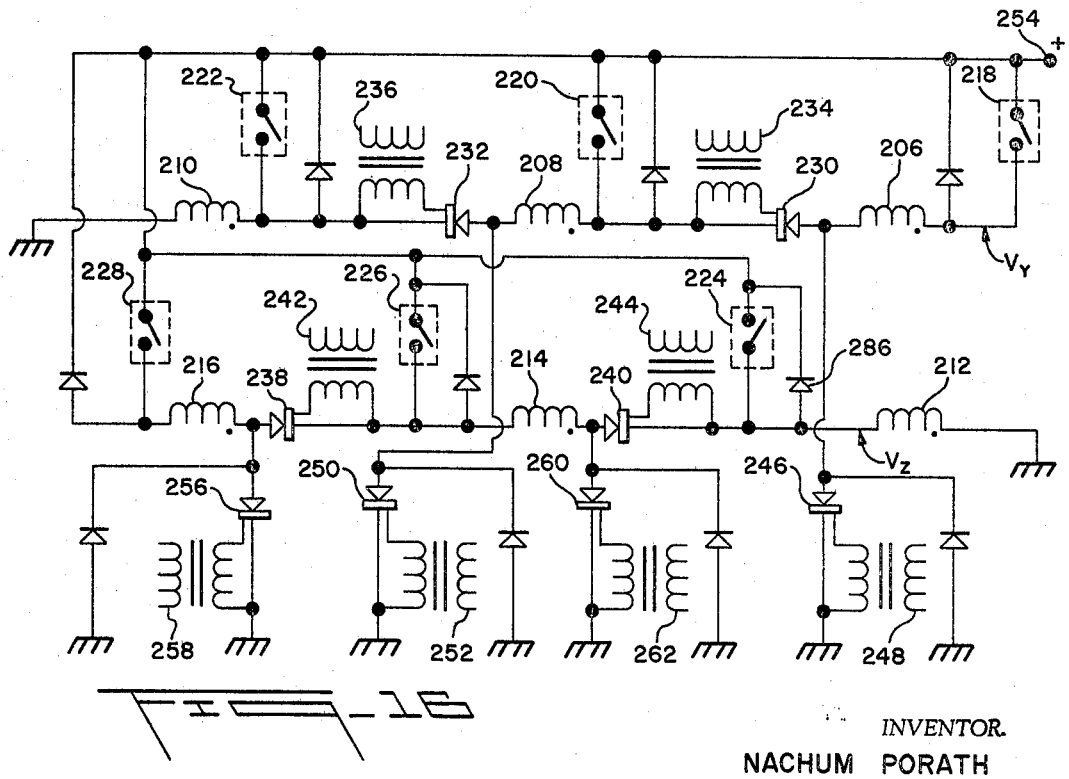

FIGURE 16 is a schematic diagram of the three pole pairs motor of FIGURE 13 control circuitry for the drive windings.

FIGURE 17 is a current-time diagram showing the ability to achieve power control by varying the duty cycle.

FIGURE 18 is a schematic diagram of the switches utilized in the circuit of FIGURE 16.

FIGURE 19 is a current and voltage-time curve for the switch of FIGURE 18.

FIGURE 20 is a current and voltage-time curve for the silicone control rectifiers in FIGURE 16 (parallel pole combination).

FIGURE 21 is a schematic diagram of the first zone polarization pattern sensing and accelerating circuit.

FIGURE 22 is a voltage-current curve for the unijunction transistor utilized in the present invention.

FIGURE 23 is an enlarged showing of the relationship between the stator poles and rotor poles of the motor of the present invention.

FIGURE 24 is the schematic diagram of the off point detector for the first zone polarization pattern.

FIGURE 25 is the timing diagram to show the operation of FIGURES 21 and 24.

FIGURE 26a is a side view of the first and second zone sensing apparatus of the present invention.

FIGURE 26b is a cross sectional view taken along lines b—b of FIGURE 26a showing the first and second zone sensing elements.

FIGURE 26c is a cross sectional view taken along lines c—c of FIGURE 26a showing the off point sensors.

FIGURE 27 is a showing of the accelerator-shutter mechanism of the present invention.

In FIGURE 1, there is shown a rotor built in accordance with the principles of the present invention and generally designated by the numeral 10. The rotor 10 is made up of a plurality of sections 12 shown specifically in FIGURE 2. The section 12 is a ceramic permanent magnet of the Indox group. The section 12 is substantially cylindrical in shape having an opening 14 extending through the center thereof and is provided with four axially extending parallel notches 16, 18, 20, and 22 formed on the outer surface thereof and defining there between the north and south poles as indicated in FIGURE 2 by the letters N and S. That is, between groove 16 and 18 is one north pole and, opposite therefrom, between grooves 20 and 22 is the other north pole. Between grooves 18 and 20 is the first south pole and between grooves 16 and 22 is the other south pole.

Since the section 12 is ceramic, it has very low operating losses at high speeds. However, to get the power and torque necessary, the rotor must have a substantial axial length. Since the ceramic section 12 must have a substantial diameter, the use of ceramic proposes a problem. Ceramic material is brittle and where severe torque variations are anticipated, it is not possible to utilize a one-piece ceramic rotor of the length and diameter required. However, as shown in FIGURE 1, the rotor 10 comprises a plurality of ceramic sections 12, separated by an inner layer of epoxy resin. The inner opening 14 is shaped so as to give the widest distribution of the rotational sheer forces which will be present. Segmenting the rotor as shown alleviates the stress conditions that might be found in a one piece unit. The epoxy resin has an elasticity coefficient that smooths the peaks of torque change. Thus, the epoxy between the ceramic sections 12 gives mechanical rigidity and eliminates any undesirable stress conditions which would be present if the individual sections 12 were simply pressed together. The sections 12, as stated previously, are separated by epoxy resin separators 24 and are held in place by steel tension bars 26, 28, 30, and 32 extending respectively along the surface of the segments 12 in grooves 16, 18, 20, and 22. Each of the steel tension bars 26, 28, 30 and 32 has its ends supported within recesses formed in epoxy end walls 34 and 36 with the ends thereof being held in tension by the utilization of suitable nuts 38 and 40. The epoxy end walls 34 and 36 are supported by steel plates 42 and 44 held in place by nuts 46 and 48 screw threaded onto a shaft 50. Shaft 50 has a hexagonal cross-section as best shown in FIGURE 3 and has moulded thereabout an epoxy member 52 for engaging the walls of the opening 14 in the sections 12.

In manufacturing this rotor it is possible to merely, roughly construct the rotor as shown in FIGURE 1, and, then, the rotor is ground to the desired tolerances. The rotor may have many poles, but for simplicity only two pole pairs have been shown.

In FIGURE 3, the stator 52 of the motor 54 is shown maunfactured of standard silicone steel sheets. The stator 52 includes a plurality of salient pole pieces 56 which have narrow air gaps between them for highest efficiency. Opposite every pole of the rotor 10 there are three poles in the stator. Thus, there are twelve pole pieces 56, 58, 60, 62, 64, 66, 68, 70, 72, 74, 76, and 78.

To understand the operation of the motor 54 the following chart of the instantaneous excitation of the poles 56–78 should be considered:

| Pole Polarization | Pole Polarization | Pole Polarization |
| --- | --- | --- |
| 56-N | 58-N | 60-N |
| 62-S | 64-S | 66-S |
| 68-N | 70-N | 72-N |
| 74-S | 76-S | 78-S |

With clorkwise rotation desired, the rotor moves one stator pole to the right, and the polarization pattern of the individual stator poles changes to the following for the continuation of the torque generation:

| Pole Polarization | Pole Polarization | Pole Polarization |
| --- | --- | --- |
| 56-S | 58-N | 60-N |
| 62-N | 64-S | 66-S |
| 68-S | 70-N | 72-N |
| 74-N | 76-S | 78-S |

This continues in order to achieve continued clockwise rotation and torque generation.

If a counterclockwise rotation is desired, starting with the position of the rotor as shown in FIGURE 3, the poles would be energized as follows to start the rotor moving to the left:

| Pole Polarization | Pole Polarization | Pole Polarization |
|---|---|---|
| 56–S | 58–S | 60–N |
| 62–N | 64–N | 66–S |
| 68–S | 70–S | 72–N |
| 74–N | 76–N | 78–S |

Thus the unique arrangement of the connection between the stator poles achieves the desired results in accordance with the principles of the present invention. Thus, looking on any combination of stator poles in a vertical line as set forth above i.e., poles 56, 62, 68, 74, or 58, 64, 70, 76 or 60, 66, 72, 78 the polarizations between these poles are always alternating and actually at any instant can assume one of two combinations: i.e.

N S N S

S N S N

As a consequence, stator poles 56, 62, 68, 74 are wound with bifilar winding sets that when energized in one direction, will cause the first polarization as set forth above, whereas current in the opposite direction will cause the second polarization. Electrically this is as shown in FIGURE 4 wherein each of the poles 56, 62, 68 and 74 is shown as having two windings thereon with one winding of each pole being connected in series, and since poles 56 and 68 are oppositely wound with respect to poles 62 and 64 the desired polarization is achieved. Thus, current supplied to first input terminal 80 will cause the first set of polarizations and, when that signal is removed, a signal applied to second input terminal 82 will cause the opposite combination of polarizations.

The operation of bifilar windings can best be understood with respect to the following explanation thereof. By the basic laws of electromagnetism a magnetic field is induced in a core by the flow of current in a conductor wound about the core. If a second wire is wound around the core in addition to the first one, in such a way that at every point of winding, the two wires run parallel to each other, a bifilar transformer or a double winding inductor is produced. What you call this type of arrangement depends upon the application.

In FIGURE 5, there is shown a double winding inductor with current being forced through each of the individual bifilar windings 84 and 86 in the direction of the arrows. The equivalent circuit for this is shown in FIGURE 5a. With this type of arrangement the flux direction in the core 88 is to the right as shown in the drawings and is cumulative of the fluxes induced by each of the currents supplied to the windings 84 and 86. When used as a transformer, the bifilar winding is as shown in FIGURE 6. In this configuration, current is supplied to primary winding 90, and induced in the secondary winding through the magnetic coupling. The current directions are as shown with the polarities as shown. The current will flow through the load resistor $R_1$ as best shown in FIGURE 6a. The dots shown in the drawing establish what the relative current direction in the primary and the secondary of the bifilar wound transformer. If current is forced into the two dotted sides of the transformer, it becomes an inductor with the current in each winding adding to the magnetic field intensity.

The equivalent circuit for a transformer and a motor are almost identical and are as shown in FIGURE 7.

In FIGURE 7, there is shown a source of voltage $V_b$ connected through a switch 94 to the idealized equivalent circuit for a transformer or motor. Whether a transformer or a motor, the circuit shows that the magnetizing inductance $L_m$ described the magnetic field through which, or by the creation of which energy is transferred from stator to rotor or from primary to secondary. The leakage inductance $L_1$ describes lack of complete magnetic flux linkage between stator and rotor. This inductance diminishes the current rate of rise in the rotor windings i.e., slows the energy transfer. The leakage inductance also lengthens the recovery time for the magnetizing inductance $L_m$. Thus, it is evident that when the switch 94 is closed, current will flow in the load $R_1$ and also, later, through $L_m$. The equation that gives this current is:

$$I_m = \frac{\int_0^t V_{lm} dt}{L}$$

In FIGURE 8, there is shown the current and voltage relations in a motor or a transformer as per the equivalent circuit of FIGURE 7. Thus, as shown in FIGURE 8, right after closing the switch 94, the load current $I_{R1}$ is equal to $V_b/R_1$, whereas the current $I_{L_m}$ in the magnetizing inductance $L_m$ is zero. As time goes on, the current $I_{l_m}$ in the magnetizing inductance increases providing energy storage. If the switch 94 is left closed "too long," the current $R_{L_m}$ will increase to the point that magnetic saturation will result. In the present invention, this result is automatically avoided. When the switch 94 is opened, the energy stored in magnetizing inductance $L_m$ just recover. The back electromotive force generated across an inductor slows down any current changes through it. This will explain the current and voltage wave forms of FIGURE 8.

The leakage inductance $L_1$ is much smaller than the magnetizing inductance $L_m$ and, thus, the leakage inductance will have to allow current reversal very quickly through it to facilitate the magnetizing inductance recovery. In addition, energy from the magnetizing inductance $L_m$, instead of being completely absorbed by the load resistance $R_L$ will again be stored in the leakage inductance $L_1$ requiring more time for complete absorption by the load resistor $R_1$. The bifilar windings minimize leakage inductance. That is, the present invention contemplates minimizing the leakage inductance between two bifilar windings that comprise the motor primary or stator because each of the bifilar windings acts as a recovery coil for the other when current is interrupted in the latter. This will be elaborated upon below.

It should be noted that in the case of a motor, the secondary is the rotor and that by rotating and performing work, the resistive load $R_1$ is achieved.

Referring to FIGURE 5, it can be seen that reversal of the flux direction in the core 88 can be achieved in a motor with bifilar wound two wire stators by reversing the current direction in one of the wires 84 or 86. Thus, coil 84 could be supplied current forced through terminal 96 and reversal of the current in coil 84 would be achieved. Only one of the coils 84 or 86 can be on at a time. If two of them are on, zero magnetization would result.

In a standard direct current motor, the stator pole pairs are fixed by the continuous direct current that polarizes them. Brushes convey direct current into the rotor windings. The rotation of the rotor and the brushes in a set, commutate the current through the rotor windings so as to always maintatin the repulsion and attraction between respective poles and maintatin the rotor rotating.

A similar motor can be built with fixed poles in the rotor i.e. a permanent magnetic rotor and the current in the stator commutated in correct phase relation to the rotor pole positions to thus maintain the rotor rotating. This means that the current in the stator windings must be bidirectional. The present invention contemplates a motor with a permanent magnetic rotor and two bifilar wound separate windings around its stator core. The two windings are used as the primary by allowing only unidirectional current in each winding. This is more clearly set forth in the showing in FIGURE 9 wherein a permanent magnet rotor with a single stator winding is schematically shown. That is, the permanent magnet rotor 100 is placed adjacent the stator core 102 having a first bifilar winding 104 and a setcond bifilar winding 106 wound thereon with two oppositely poled diodes 108 and 110 in series, respectively, with the windings 104 and 106.

Current from alternating pulse source 112 generated flux, first in winding 104 in one direction and then in winding 106 in the opposite direction. As far as the rotor is concerned, this two diode, two winding arrangement is exactly equivalent to the single winding primary with bidirectional current through it.

A mechanical system to implement flux reversal is shown in FIGURE 10. In this scheme, the two bifilar windings 104 and 106 serve as the stator. The current direction and the flux direction in the bifilar windings 104 and 106 depend on the state of a single pole double throw switch 112. Here, the alternating current pulse source is not needed, only the battery 114 is required. As stated above, during the time that winding 104 of FIGURE 10 carries current, energy is stored in the magnetizing inductance $L_m$ of the motor. When the current in wniding 104 is interrupted (still no current in winding 106) the magnetizing inductance $L_m$ starts to give back the energy stored in it. The recovery of the magnetizing inductance $L_m$ can be accomplished through any closed electrical path across the magnetizing inductance $L_m$ as shown in FIGURE 7. In the case of the motor, the secondary or the rotor will always be connected across the magnetizing inductance and as consequence will always serve as a recovery path. In addition another recovery path materializes if two diodes are added to each of the windings of FIGURE 10 as shown in FIGURE 11. Thus, the diodes 116 and 118 operated as follows:

When a single pole double throw switch 112 opens the circuit to coil 104, the dot side of the coil 104 will swing negative. Diode 118 will stay reversed biased. Due to the transformer action between the two bifilar windings, the undotted side of the other winding swings positive, forward biasing diode 116 and establishing another closed electrical path i.e. another recovery path. Inasmuch as the two primary windings serve as recovery paths to each other, by the transformer action between them, leakage inductance $L_1$ between the two windings becomes the decisive factor in the effectiveness with which each winding will serve as a recovery path for the other.

In FIGURE 12 there is shown a single pole pair permanent magnet motor with a bifilar wound stator. Thus, in FIGURE 12 the stator 138 as a single pole pair permanent magnet rotor 140 mounted for rotation in the center thereof and, on its parallel legs 142 and 144 it has wound thereon bifilar coils 146, 148 and 150, 152. Bifilar winding 150 is in series circuit relation with bifilar winding 148 and is connected between ground and one contact 154 of single pole double throw switch 156. The other contact 158 of switch 156 is connected in series with coils bifilar windings 146 and 152. Switch 156 is connected through battery 160 to ground. Thus, the polarization pattern is achieved through the utilization of single pole double throw switch 156 and the advantages of the use of bifilar windings stressed above are inherent in the structure shown in FIGURE 12.

FI1URES 13a and 13b show multipole pair permanent magnet motors utilizing bifilar wound stator poles. Thus, in FIGURES 13a and 13b the stator 162 has three pole pairs 164, 166; 168, 170; and 172, 174 poles with pairs of bifilar windings wound thereabout with one bifilar winding of each pole pair being in series with one winding of every other pole and oppositely wound with respect to the next adjacent pole, said one windings being connected an adjacent pole to achieve a second zone polarization through terminal 176 to single pole double throw switch 178 to achieve a first zone polarization pattern. The other terminal 180 of single pole double throw switch 178 is connected to the other windings of the poles, said other windings being each connectetd in series and oppositetly wound with respect to an adjacent pole to achieve a second zone polarization pattern. The single pole double throw switch 178 is, of course, connected through a battery 182 to ground. Thus, even in a motor with a few pole pairs as shown in FIGURES 13a and 13b, only two polarization patterns are needed to keep the rotor rotating. The stator is wound with the two bifilar wires in such a way that current in one bifilar wire results in one pole pair polarization pattern as shown in FIGURE 13a and the second or other pattern when the other bifilar wire is conducting as shown in FIGURE 13b. For purposes of clarity, flux directions have been shown by appropriate arrows. The rotor 184, of course, has shown three adjacent pole pairs corresponding to the three pole pairs in the stator. In FIGURES 13a and 13b current can pass through each of the two windings in one direction only. This allows the use of a unidirectional switch for each winding.

FIGURE 14 is a schematic showing of series drive windings of a three pole-pair motor similar to that shown in FIGURES 13a and 13b. In FIGURE 14, one coil 186 designates two adjacent bifilar windings on two poles or one pole pair. Similarly, coils 188 and 190 also show two adjacent bifilar windings or one pole pair. The bifilar windings corresponding to pole pairs 186, 188 and 190 and adapted to be oppositely energized are shown respectively as 192, 194, and 196. Windings 192, 194 and 196 are in series with switch 198 connected to battery 200. Coils 186, 188 and 190 are connected to the ground and switch 202 also connected to a battery 204. The motor load is schematically shown as the resistor $R_1$ associated with each of the pole pairs 186, 192; 188, 194; 190, 196. It should be noted the voltage across pole pairs 186, 188, and 190 is, individually, one-third the voltage of the battery 204. Similarly, the voltage on individual pole pairs 192, 194 and 196 is one-third the voltage of battery 200. If the load seen by each pole pair is $R_1$ then the torque delivered to the load is approximately $V_b^2/3R_1^2$ (where $V_b$ is the voltage of battery 200 or 204). If we could impress $V_b$ across each pole pair, the torque delivered to the load would be $3V_b^2/R_1^2$. In other words, a torque ratio of one to nine can be achieved by connecting the stator windings in a parallel arrangement rather than a series arrangement. For this purpose, FIGURE 15 shows the motor of FIGURES 13 and 14 connected in a parallel arrangement. It can now be seen that torque control of the motor utilizing the principles of the present invention can be achieved by switching electronically between series and parallel pole pair combinations.

In FIGURE 16, there is shown a three pole-pair motor switching arrangement for the apparatus in FIGURES 13a and 13b. In FIGURE 16, one bifilar winding of a stator pole pair is shown schematically as a coil 206, and is arranged for connection with respect to a second stator pole pair bifilar winding 208 and a third stator pole-pair bifilar winding 210. The other bifilar winding stator pole-pair associated with pole-pair 206 is designated by the numeral 212, and the bifilar winding stator pole-pair associated with pole pairs 208 and 210 are designated as 214 and 216 respectively. For purposes of simplicity, mechanical switches 218, 220, 222, 224, 226 and 228 have been shown, it being understood that these represent unidirectional electronic switches which can be switched by small electrical pulses.

In FIGURE 16, the situation wherein the pole pairs are in series a motor is operating in a low torque condition is achieved when switch 218 is closed and silicon controlled rectifiers 230 (connected between pole pairs 206 and 208) and 232 (connected between pole pairs 208 and 210) are conducted. Silicon controlled rectifiers 230 and 232 are controlled by appropriate gate signal windings 234 and 236 respectively. For the opposite polarization, switch 218 is opened, switch 228 is closed, and silicon controlled rectifiers 238 (connected between pole pairs 216 and 214) and silicon controlled rectifier 240 (connected between pole pairs 214 and 212) are conducting. Silicon controlled rectifiers 238 and 240 are controlled respectively by their trigger circuit control coils 242 and 244. Of course, switches 220, 224 and 226 remain open under the low torque conditions.

In the high torque, low or high speed condition, the pole pairs are to be placed in parallel. Under these conditions, one of two polarizations is always present. That is, one polarization requires that switch 218 is closed and silicon controlled rectifier 246 is conducting by reason of energization of its trigger circuit control coil 248 thus energizing pole pair 206; switch 220 is closed and silicon controlled rectifier 250 is conducting by reason of energization of its trigger circuit control coil 252 thus energizing pole pair 208; and switch 222 is closed thus supplying current to pole pair 210. All of these pole pairs 206, 208, and 210 will then receive the full voltage at terminal 254. The other polarization is achieved by opening switches 218, 220 and 222 and making switches 246 and 250 nonconducting; closing switch 228 and having silicon controlled rectifier 256 conducting by reason of a signal received from its trigger circuit control coil 258 to apply the full voltage across pole pair 216; closing switch 226 and making silicon controlled rectifier 260 conducting by reason of energization of its trigger circuit control coil 262 to apply full voltage from terminal 254 to pole pair 214; and closing switch 224 to supply the full voltage from terminal 254 to pole pair 212.

The selection of series or parallel pole pair excitation determines the torque generated. The duration of the pulse within one pole pair position determines the power delivered to the load. Thus, as can be seen by FIGURE 17, the power delivered to the load is controlled by varying the duty cycle. Thus, the present invention combines both continuous torque and continuous power control.

To achieve the control characteristics mentioned above, the apparatus should have the following capabilities:

(a) Voltage pulses of variable width should be made applicable across a load that may be changed by pressing a button to effect a desired series or parallel pole pair combination;

(b) Rotor pole positions should be capable of being sensed at any instant so that only the correct set of switches is actuated;

(c) Manual selection or automatic selection of any desired series or parallel pole pair combination should be within the capabilities of the apparatus; and recovery paths for the magnetic portions of the system should be provided.

First, to achieve the above, switches are necessary to handle the high voltage (100 volts to 500 volts) and the high current (up to 200 amps.) present in the system. In addition, the switches must be turned off and on in tenths of microseconds. These types of switches, are at present, not in existence. To avoid this problem, the circuit of FIGURE 18 was designed to give the characteristic of the type of switch set forth above. In FIGURE 18, there is shown the battery 264 and the load 266 connected on opposite sides of the high power switch 268 shown in dotted line. The switch 268 includes two silicon controlled rectifiers 270 and 272 each controlled respectively by trigger circuit control coils 274 and 276. Silicon controlled rectifier 270 is connected across the battery 264 in series with inductor 278 and capacitor 280. Silicon controlled rectifier 272 is connected in series between the positive terminal battery 264 and the load 266. A third silicon controlled rectifier 282 having a trigger circuit control coil 284 is connected between inductor 278 and capacitor 280 and the positive terminal of load 266.

When the switch 268 is "off" silicon controlled rectifiers 272, 270 and 282 are "off" or nonconducting. The switch 268 is termed "on" by transmitting a trigger pulse to coils 274 and 276 thus making silicon controlled rectifiers 270 and 272 conducting. Silicon controlled rectifier 272 applies the battery 264 voltage across the load 266. Silicon controlled rectifier 270 charges the capacitor 280 through inductor 278. The current through silicon controlled rectifier 272 will increase linearly as shown in FIGURE 19. Silicon controlled rectifier 270 current, on the other hand, will start to reverse after a period of time determined by the time constant of inductor 278 and capacitor 280. This will leave capacitor 280 charged to double the battery voltage and will switch silicon controlled rectifier 270 off. To turn off the switch 268, silicon controlled rectifier 282 is turned on through its control coil 284. The charge on capacitor 280 will be discharged through silicon controlled rectifier 272 into the battery. This momentarily reverses the current through silicon controlled rectifier 272 and switches if off. Capacitor 280 continues to discharge into the load through silicon controlled rectifier 282 which is still on until it charges in the opposite polarity. At that moment, the current starts to reverse through silicon controlled rectifier 282 switching it off. This can best be seen in FIGURE 19.

Referring back of FIGURE 16 switches 218, 220, 222, 224, 226 and 228 are manufactured of the type shown in FIGURE 18 and designated as switch 268. In other words, switch 268 should replace each of the above mentioned switches.

Silicon controlled rectifier 230, 238, 232, 240, 246, 250, 256, and 260 do not have to be switched off actively These silicon controlled rectifiers turn off at the end of each "on" cycle due to the current in their respective loop decreasing to zero and as a consequence they need no special turn off apparatus as was required in switch 268. This is best shown with respect to the current and voltage time diagrams for the parallel pole pair arrangement shown in FIGURE 20. In this pattern, it must be understood that in order to have the individual silicon controlled rectifiers return to their nonconducting state, it is necessary that the area under the voltage time curve when $V_y$ of $V_z$ is positive must be equal to the area under the voltage time curve when $V_y$ or $V_z$ is negative. It should also be noted that the switches 218, 220, 222, 224, 226 and 228 all have back polarized diodes (such as diode 86 which bypasses switch 224) there across to allow the passage of back currents. The current wave form associated with the diode 286 is also shown in FIGURE 20.

Referring again to FIGURE 16, the logical sequence of running a motor is as follows:

(1) Determine which (series or parallel) stator pole connection is desirable. In a vehicular motor almost without exception, one starts with low speed and relative high torque. Therefore, on start up, all of the stator poles are in parallel for maximum torque. This decision is usually made by the vehicle operator by manually setting a switch. This would be equivalent to starting an ordinary automobile in low gear.

(2) The accelerator pedal is pushed down to achieve desired acceleration. The physical location of the rotor poles in relation to those of the stator is automatically sensed by a detector scheme set forth below. The detector selects the proper switches and silicon controlled rectifiers that will be turned on off (see FIGURE 21).

(3) After the desired speed has been reached by the vehicle, the operator will select the series pole-pairs connection by selecting another switch and the condition for relatively low torque, high speed is achieved.

Referring to FIGURE 21 there is shown a first zone detector sensor and accelerator circuit. This circuit is utilized in conjunction with a shutter and photocell arrangement which determines the position of the rotor and, thus, the position of any particular pole pair. In referring to FIGURE 21, and assuming that, as will be discussed later, the rotor can be physically determined to be in a first pole pair pattern, this means that a first photocell 288 having its upper terminal connected to a direct current source at line 290 is illuminated. Since photocell 288 is connected to the base of transistor 292, its drop in resistance will transmit a current signal to the base of transistor 292 making it fully conducting and, accordingly, making complementary transistor 294 nonconducting. Both transistor 292 and 294 have their emitters connected to the negative voltage source 295. When transistor 292 conducts, transistor 294 is cut off, transistor 296 having its base connected to the collector of transistor 292 will be shut off as the base voltage will drop and, accordingly, transistor 298 will be shut off as its base circuit is connected to the collector of transistor 296. Since a capacitor 300 is placed between the collector and emitter of transistor 298, and transistor 298 is no longer conducting, capacitor 300 will charge to the voltage at terminal 290. At the same time, transistor 302 having its base connected to the collector of transistor 294 will be turned on thus transmitting a signal to the base of transistor 304 connected between the second photocell 306 and terminal 290. This completes the circuit to allow the charging of capacitor 300. The photocell 306 acts as a variable resistor during this charging operation. The ohmic value of this resistor is determined by an accelerator which modulates the light intensity of a light source photocell system shown best in FIGURE 27. This will be discussed below. A unijunction transistor 308 has its gate terminal connected to the positive side of capacitor 300. Unijunction transistor 308 has a special characteristic as is best shown in FIGURE 22. This characteristic causes a quick discharge of capacitor 300 into the base of transistor 310 when the voltage across capacitor 300 goes over the peak voltage $V_p$ as shown in FIGURE 22. This discharge will drive a sharp pulse into the base of transistor 310 and as a consequence a high power pulse will appear on the secondary of transformer 312. Switch 315 is operated manually by the operator for the different pole pair connections. In the position shown, the parallel connection is achieved. Thus, three transistors of the group designated as 314 drive double secondary transformers 316 and are individually associated with switches 218, 220, and 222. These transformers 316 drive trigger coils 274 and 276 of transistors 270 and 272 in the individual switches 268 shown in FIGURE 18. In other words the trigger coils 274 and 276 are always triggered simultaneously. The remaining two transistors of group 314 drive single secondary transformers 318 which are associated with coils 248 and 252 in FIGURE 16. It should be noted that if the light source that illuminates photocell 288 burns out, photocell 288 will become a high impedance regardless of the physical rotor location delaying significantly the turning on of silicon controlled rectifiers 270 and 272 in the switches 218, 220, and 222. This is a desirable safety feature. At this point, the motor is being driven through all the switches and silicon controlled rectifiers that control the current loops. The silicon controlled rectifiers 270 of each switch 218, 220, 222 are already off. The rotor approaches a point which is half way the distance between the two stator poles as per FIGURE 23. In FIGURE 23, there are shown two adjacent stator pole pairs with the rotor being driven in a clockwise direction and the angle indicating the physical angle during which the first pole pattern exists. The time T is the time it takes in a particular revolution per minute for the rotor pole m of the rotor to traverse α/2 physical degrees. It will be understood that the maximum physical degree during which the stator windings will be driven is α/2 the remaining α/2 of physical degrees being left for magnetic recovery.

When the rotor approaches the end of α/2 degrees, photocell 320 shown in FIGURE 24 which is fully illuminated most of the time is blocked from its light source. Thus FIGURE 24 is a diagrammatic showing of the off point detector for the first zone. When photocell 320 is not illuminated, transistor 322 is shut off as the current from direct current source 324 drops and, accordingly, transistor 326 is turned on. Turning transistor 326 on also turns on tunnel diode 328 and its associated transistor 330 which has its base connected to the tunnel diode 328. The conduction of transistor 330 causes the conditional blocking oscillator consisting of transistor 332 and transformer 334 to move to a free oscillation mode. As a consequence, a high power pulse will appear on the secondary of transformer 336.

Switch 338 which is mechanically tied to the switch 315 of FIGURE 21 drives an "on" pulse to all of the trigger coils 284 silicon controlled rectifiers 282 in the switches 268 as shown in FIGURE 18. These rectifiers were previously turned "on" and, thus, the switches are now turned off. This is accomplished as the coil 284 is in the collector circuit of transistors formed in group 340. It should be noted in FIGURE 24 that the output from transistor 332 is generated only when switch 218 in FIGURE 16 is on. Referring back of FIGURE 16 it is easy to see that switch 218 is common to series or parallel pole connections. The cathode of the silicon controlled rectifier 272 in switch 218, when on, is one to two volts below the voltage at terminal 254. Supplying the power to transistor 332 from the cathode of silicon controlled rectifier 272 relieves the situation in which the motor could not have been started if left in a position wherein photocell 320 was not illuminated.

If the light source illuminating photocell 320 is burned out, a pulse to silicon controlled rectifier 282 of switch 218 will be generated for the first polarization zone or in the second polarization zone for switch 228. In other words, silicon controlled rectifier 272 will stay on a very short time allowing very little power to be delivered to the load. This situation is not dangerous and easily detectable.

Switching off the stator current at half the physical distance of each interval distance is very significant because it allows equal time for magnetic recovery of the magnetizing inductance $L_m$ of the motor. The maximum volt-seconds that the motor magnetizing inductance can be exposed to, during the on time of the motor, is $V_b$ times $T_{a/2}$ where $T_a$ is the longest time the rotor will stay in the interpole zone and $V_b$ is the voltage at terminal 254. The longest time the rotor will stay in the interpole zones occurs during the slowest speed. If we have a stall condition i.e. the load is too heavy for the motor to handle the rotor may stay in one zone too long causing excessive current flow therein. This situation is relieved automatically by transistors 342 and 244 of FIGURE 24. If the switches 268 are not switched off before, these switches are turned off due to the time constant of resistance 346 and capacitor 348 of FIGURE 14. Capacitor 348 here starts charging when silicon controlled rectifier 272 cathode of switch 218 is on. When it reaches a finite value, unijunction transistor 342 will fire causing a pulse to be sent to transformer 336 and to the transistors 282 as discussed previously. The diode 350 and resistor 352 act as a discharge path for the capacitor 348 when switch 218 is off.

The magnetic inductance $L_m$ of the motor built up during the recovery time, a voltage with the opposite polarity than that during the on period. The recovery of every set of zone pole-pair first polarity pattern coils is done through the equivalent resistance of the rotor $R_1$ in parallel with the zone pole-pair second polarization pattern physical windings and the ten diodes 286 shown in FIGURE 16 in parallel with the switches. This can be verified by looking at the wave forms of FIGURE 20. Considering the dot convention established previously, when point $V_y$ goes negative, point $V_z$ goes positive forward biasing diode 286 associated with switch 224, establishing another path for discharge. In effect, part of the energy stored in the magnetizing inductance is not completely lost in cycle but is returned back to the battery. It is here that the bifilar winding technique used for stator windings becomes extremely important because it determines whether magnetic recovery during each cycle is possible.

Referring back to FIGURES 21 and 24, it will be seen that the following can be said regarding the functions of the individual photocells:

Photocell 288 is illustrated during the first $T_a$ time period. It serves as the first polarization pattern zone sensor.

Photocell 306 acts as a first polarization zone accelerator control, i.e. higher illumination achieves higher power by lengthening the duty cycle.

Photocell 288' (FIGURE 26) similar in operation to photocell 288 has a circuit associated therewith similar to that shown in FIGURE 21 and is adapted to be illuminated during the first $T_b$ time period and to serve as a zone sensor for the second polarization pattern.

Photocell 306' (FIGURE 27) is similar to photocell 306 of FIGURE 21. It is operative as an accelerator control for the second zone polarization pattern and, with higher illumination is adapted to lengthen the duty cycle and thus provide higher power.

Photocell 320 is the first polarization zone off point sensor which is always illuminated except when it senses that the first zone off point has been reached and then the light is cut off.

Photocell 320' (FIGURE 26) is the second zone polarization pattern off point sensor which also operates in the same manner as photocell 320 and has a circuit associated therewith which is similar in operation to that of photocell 320.

It should be noted that if the switch 315, 358 is moved from the position shown in FIGURES 21 and 24 the control circuit will operate the switches required to place the motor in series operation rather than the parallel operation as shown. Accordingly, merely by a small manual movement, it is possible to "gear shift" a motor to change from high torque low speed operation to a low torque high speed operation.

MECHANICAL APPARATUS

The zone sensing is set forth in FIGURES 26a, 26b, and 26c. These drawings show how the photocell 288 is made to sense the beginning of zone one where the first zone pole pair pattern exists and, photocell 288' is made to sense beginning of the second zone pole pair pattern.

Two channels 360 and 362 are cut in a short extension of the motor shaft 364 with a triangular cross section inside. FIGURE 26b is a cross sectional view taken through channel 360 and FIGURE 26c is a cross sectional view taken through channel 362. The triangular cross section is designed for a three pole pair motor, it being understood that a four pole pair motor would require a square cross section, etc. From FIGURE 26b it can be seen that with proper location of the respective light sources 366 and 366' associated respectively with photocells 288 and 288' that the latter can be made to be illuminated three short periods during one complete motor shaft revolution. The same mechanical scheme is used for detecting the entry of the shaft into the second polarization pattern zone as is used for the first polarization zone detection except that the light source 366' and photocell 288' are physically displaced 60° relative to the light source 366 and photocell 288.

Using basically the same physical components in the channel 362, the illumination periods for photocell 320 from light source 368 is achieved by moving the bulb 368 and photocell 320 away from the shaft by the correct amount so that the photocell 320 is always illuminated except for those short periods when the points of the triangular channel 362 break the light beam between source 368 and photocell 320. Here again the second off sensing photocell 320' is illuminated by a light source 368' which is displaced from the photocell 320 and light source 368 by 60°. Light source 368' and photocell 320' are utilized to detect the off point of the second zone polarization pattern.

The accelerator-shutter system is shown in FIGURE 27. Thus, the photocell 306 is shown mounted in a tube 370 at one end of which is positioned a light source 372. A lens 374 is placed between the photocell 306 and the light source 372. A shutter 376 is positioned between the lens 364 and photocell 306 and, as shown in the drawings, is normally in the closed position preventing light from the lamp 372 from reaching the photocell 306. When the accelerator pedal is pressed downwardly, linkage 378 forces the shutter 376 to open and, accordingly, to illuminate the photocell 306. Thus, the amount of light that will reach the photocell 306 can be varied as a function of the position of the shutter 376. Further, as can be seen from the drawing, if the operator's foot is moved from the accelerator pedal, or if the spring 380 which normally biases the linkage 378 is broken, gravity will prevent loss of control of the vehicle by returning the shutter 376 to the position shown wherein no light is received by the photocell 306. This will limit the duty cycle of the motor.

Thus, the present invention provides both torque and power control of a brushless direct current motor which is simple to operate, economical in cost, does not require brushes, commutators, or the like, and can be controlled for rotation in any direction.

The present invention may be embodied in other specific forms without departing from the spirit or essential attributes thereof and, accordingly, reference should be made to the appended claims rather than to the foregoing specification as indicating the scope of the invention.

I claim as my invention:
1. A permanent magnet rotor type motor comprising a permanent magnet rotor having at least one pole pair, a stator, said rotor being mounted for rotation within said stator, said stator having at least two poles forming a stator pole pair, a pair of bifilar windings wound on each pole of said stator pole pair, energization means for energizing said bifilar windings, one bifilar winding on one pole of the stator pole pair being connected to provide one polarization and one bifilar winding on the other pole of the stator pole pair being connected to provide the opposite polarity, the other bifilar winding on each pole of the stator pole pair being connected to provide a polarization opposite from the polarization of said one bifilar winding on each stator pole and said other winding on the other pole of the stator pole pair, and switching means for selectively connecting the said one bifilar winding to said energization means while said other bifilar windings are disconnected from said energization means and vice versa, a second stator pole pair having bifilar windings on each pole exactly like said first mentioned stator pole pair, and torque control means for connecting said one windings of said stator pole pairs in series and said other windings of said stator pole pairs in series to achieve low torque, high speed operation of said motor, and alternatively, to connect said one windings of said stator pole pairs in parallel and said other windings of said stator pole pairs in parallel to achieve high torque, low speed operation of said motor.

2. The permanent magnet rotor type motor of claim 1 wherein said torque control means includes a static switch, said static switch including a controlled unidirectional current device, said controlled unidirectional current device being operative to remain conducting after triggering thereof, energy storage means operative from said controlled unidirectional current device, energy storage control means for selectively transmitting the energy stored in said energy storage means to transmit a current in a direction opposite from the direction which current normally flows through said unidirectional current device so as to turn off said unidirectional current device and to transmit the energy stored in said energy storage means to the load.

3. The permanent magnet rotor type motor of claim 2 wherein said controlled unidirectional current device is at least one silicon controlled rectifier, said energy storage control device being at least one silicon controlled rectifier.

4. The permanent magnet rotor type motor of claim 3 including power control means operative to vary the time period during which current is applied to said one windings or said other windings from said energization means.

5. The permanent magnet rotor type motor of claim 4 wherein said power control means includes a radiation sensitive device, a source of radiation control means for controlling the radiation applied to said radiation control device from said source of radiation to control the power applied to said motor.

6. The permanent magnet rotor type motor of claim 5 wherein said radiation control means is operative to provide minimum power when said radiation source loses its power.

7. The permanent magnet rotor type motor of claim 1 wherein said switching means includes pole position sensing means, said pole position sensing means is operative to sense the angular rotation of one rotor pole pair over an angle equal to the separation between said stator pole pairs to change the connection of said one bifilar windings from connection with said energization means to connection of said other bifilar windings to said energization means and the disconnection of said one bifilar windings from said energization means or vice versa.

8. The permanent magnet rotor type motor of claim 7 wherein said rotor has an extension thereof, indicating means associated with said rotor extension for detecting rotation of said rotor pole pairs through said angle.

9. The permanent magnet rotor type motor of claim 8 wherein said detection means includes a radiation sensing device, said radiation sensing device being operatively controlled by said rotor extension.

10. The permanent magnet rotor type motor of claim 7 including off position sensing means, said off position sensing means being operative to sense when a rotor pole pair has rotated to a distance one half the angle between adjacent stator pole pairs and to prevent said energization means from supplying further power to said bifilar windings until said pole position sensing means is further operative.

11. The permanent magnet rotor type motor of claim 10 including safety means, said safety means being operative to detect failure of said off point sensing means, said safety means being further operative, when said off point sensing means fails, to perform the function of said off point sensing means.

References Cited

UNITED STATES PATENTS

| | | | |
|---|---|---|---|
| 3,169,203 | 2/1965 | Lauin et al. | 310—156 |
| 3,215,876 | 11/1965 | Nichols et al. | 310—156 |
| 3,280,396 | 10/1966 | Beck et al. | 318—138 |
| 3,281,630 | 10/1966 | Liang | 318—138 |
| 3,305,713 | 2/1967 | Ikegami | 318—138 |
| 3,305,717 | 2/1967 | Weiss | 318—254 |
| 3,328,658 | 6/1967 | Thompson | 318—138 |
| 3,353,076 | 11/1967 | Haines | 318—138 |
| 3,399,318 | 8/1968 | Mayer et al. | 310—156 |

ORIS L. RADER, Primary Examiner

G. R. SIMMONS, Assistant Examiner

U.S. Cl. X.R.

310—49, 156, 188